Dec. 14, 1971    I. D. ZINNER ET AL    3,626,594
SEPARABLE DENTURE TRAY
Filed March 30, 1970
FIG. 1
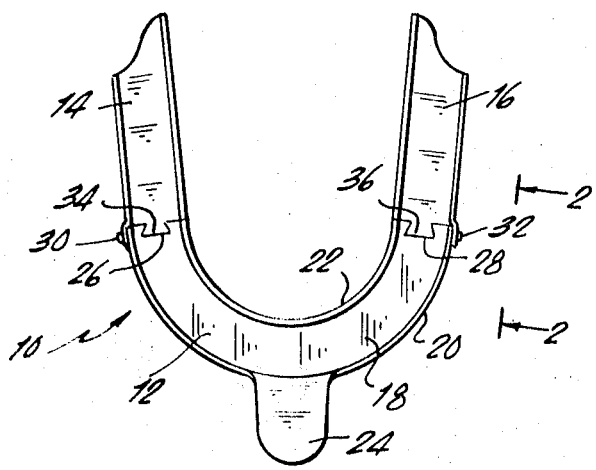
FIG. 2
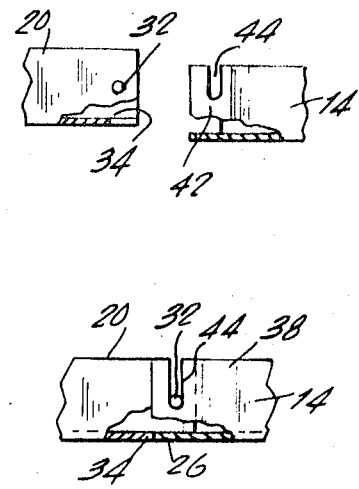
FIG. 3
FIG. 4
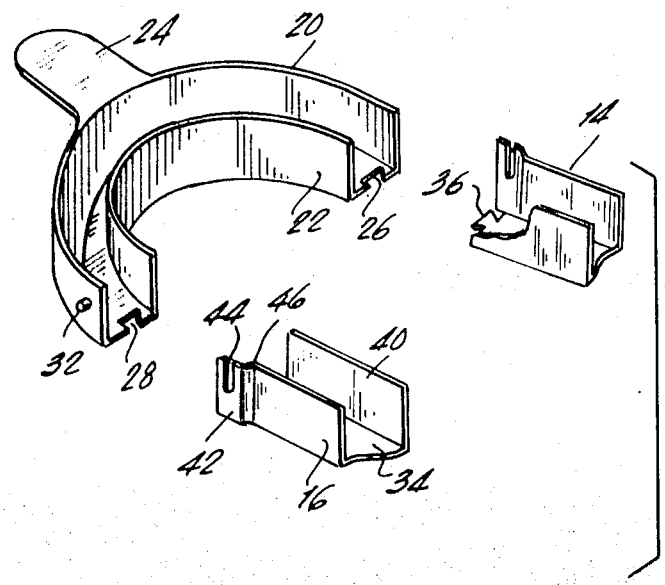
INVENTORS
IRA D ZINNER
BY HERBERT SHERMAN
Kenneth S. Goldfarb
ATTORNEY

United States Patent Office 3,626,594
Patented Dec. 14, 1971

3,626,594
SEPARABLE DENTURE TRAY
Ira D. Zinner, 165 N. Village Ave., Rockville Centre, N.Y. 11570, and Herbert Sherman, 200 E. 15th St., New York, N.Y. 10003
Filed Mar. 30, 1970, Ser. No. 23,888
Int. Cl. A61c 9/00
U.S. Cl. 32—17     4 Claims

ABSTRACT OF THE DISCLOSURE

A dental impression tray comprising a central portion of generally arcuate shape and having detachable leg portions. There is provided a dovetail interlock between the co-planar bottoms of the central portions and the legs. A vertical sliding connection by way of cooperating pins and slots is provided, the entire dental impression tray being generally channel shaped and being provided with a handle on the central portion thereof.

---

This invention relates to a dental impression tray and, more particularly, to a device of the type which is sectional in character and which is equally adapted for use in obtaining impressions of both the upper and lower jaw.

In the past, various generally horseshoe shaped dental impression trays have been developed which have had one or more variations in structure for making these trays adjustable within a limited range. However, these trays have generally been adjustable only within their own shape and size to fit the conformation of a patient's mouth but were not readily adaptable for mouths of different sizes, as for example, children as compared to adults or women as compared to men.

The concept of the present invention overcomes the disadvantage of the prior art by providing a multiple sectional channel shaped tray having a generally U-shaped central portion which may be of a predetermined size having legs of varying sizes which legs may be easily attached and removed from the central portion while in the patient's mouth, thereby enabling the careful separation of the dental tray from the teeth after an impression has been taken and removable of the tray pieces from the mouth of the patient without in anyway distorting the impression which has been made.

One of the structural features of the invention lies in the combination vertical sliding and dovetail locking connection between the leg portions of the dental impression tray and the central portion thereof.

Still further objects and features of this invention reside in the provision of a dental impression tray that is simple in construction, capable of being manufactured out of readily available materials, which is especially simple for the dentist to utilize while being extremely comfortable for the patient and which is effective for use in obtaining accurate dental impressions.

A further object of the present invention resides in the provision of a separate central portion and separable leg portions, which leg portions are provided in a multiplicity of sizes and shapes which when utilized with one of several central portions will provide a dental impression tray which will be of the exact size and shape as to conform to the patient's mouth from which the impression is to be taken.

A still further object of the present invention is to provide a dental impression tray which will conform exactly to the size and shape of the patient's mouth and which tray and the component parts thereof are easily cleaned and sterilized in that there are no complicated and overlapping parts to be cleaned.

These, together with the various ancillary objects and features of this invention, which will become apparent as the following description proceeds, are attained by this separable denture tray, a preferred embodiment of which is illustrated in the accompanying drawing, by way of example only, wherein:

FIG. 1 is a top plan view of a dental impression tray in accordance with the concepts of the present invention;

FIG. 2 is a partial elevational view with parts being broken away to show parts in detail illustrating the connection means between the central portion of the dental tray and one of the legs;

FIG. 3 is a view similar to FIG. 2 but showing the parts as connected; and,

FIG. 4 is an exploded perspective view with parts being broken away to show details with greater clarity of the dental impression tray.

With continuing reference to the accompanying drawing, wherein like reference numerals designate similar parts throughout the various views, reference numeral 10 generally designates a dental impression tray constructed in accordance with the concepts of the present invention which has three main parts, a channel shaped central portion 12 and two channel shaped legs 14 and 16. The dental impression tray is of a generally horseshoe shape and the central portion is U-shaped having a preferably flat bottom 18 and substantially parallel arcuate walls 20 and 22 having preferably a common radial center. Integral with the side wall 20 is a handle 24 for facilitating the insertion and removal of the dental tray into a patient's mouth. The bottom 18 has its ends provided with dovetail shaped recesses 26 and 28 and pins 30 and 32 which preferably are integrally formed with the side wall 20 and extend horizontally outwardly from approximately the midpoint of the height of the side wall 20.

The leg portions 14 and 16 are preferably similar to each other in construction and only the leg portion 16 will be discussed in detail. The leg portion 16 includes a bottom 34 adapted to lie flush with the bottom 18 and has a dovetail shaped projection 36 which extends forwardly and is adapted to interlock with the bottom 18 and seat in the dovetail recess 26 forming a tongue and groove connection and an interlock against movement of the leg 16 either toward or away from the central portion 12 or laterally with respect thereto. The leg 16 is preferably provided with an outer side wall 38 and inner side wall 40 which lie flush with the side walls 20 and 22 and form continuations thereof. The side wall 38 is provided with an angle shaped offset extension 42 having a slot 44 opening into the top surface 46 of the angle shaped offset projection 42 which is adapted to seat the pin 32 to form a vertical sliding connection cooperating with the tongue and groove interlock 36, 28 between the leg 16 and the central portion 12 and preventing relative twisting there between.

It is to be recognized that various patients' mouths have deformities and infirmities rendering necessary the use of different size and shape leg portions 14 and 16 and such leg portions can be readily substituted after having been selected by the dentist to conform to the shape of the patient's mouth. After selecting the desired legs 14 and 16 and assembling the dental impression tray, a suitable impression material such as wax, synthetic plastic material or the like may be disposed in the assembled tray. Then the entirely assembled tray can be suitably placed in the patient's mouth and the impression taken of the upper or lower jaw. Because of the detachable connection of the legs 14 and 16 with the central portion 12, these legs may be removed from the patient's mouth separately after the impression has been taken and a cast may be taken without any deformation because of the fact that the bottoms of the legs as well as the central portion lie co-planar and flush with each other and the dovetail interlock prevents movement of the parts relative to each other plane of the bottom parts of the tray.

A latitude of modification, substitution and change is intended in the foregoing disclosure, and in some instances, some features of the invention will be employed without a corresponding use of other features.

We claim:

1. A dental impression tray comprising a channel shaped arcuate portion having a bottom provided with grooves at the ends thereof, a pair of channel shaped legs each having projections thereon for lockingly seating in said grooves, and cooperating vertical sliding connection means on said central portion and said legs to central portion, wherein said means includes pins on said central portion and slots in said legs, said pins fitting in said slots.

2. A dental impression tray in accordance with claim 1, wherein said projections are of dovetail shape, said recesses being of dovetail shape.

3. A dental impression tray in accordance with claim 1, wherein said legs have substantially angle shaped extensions which overlie said central portion, said slots being formed in said extensions.

4. A dental impression tray in accordance with claim 3, wherein said central portion and said legs have coplanar bottoms, said recesses and said projections being dovetail in shape and being formed in said bottoms.

References Cited
UNITED STATES PATENTS 981,476   1/1911   Rowse _____ 32—17

ROBERT PESHOCK, Primary Examiner